United States Patent

[11] 3,557,913

| [72] | Inventor | Leveret C. Russler<br>Milwaukee, Wis. |
| --- | --- | --- |
| [21] | Appl. No. | 803,542 |
| [22] | Filed | Mar. 3, 1969 |
| [45] | Patented | Jan. 26, 1971 |
| [73] | Assignee | Harnischfeger Corporation<br>Milwaukee, Wis.<br>a corporation of Wisconsin |

[54] COMBINATION SERVICE AND PARK FLUID OPERATED BRAKE
1 Claim, 2 Drawing Figs.

[52] U.S. Cl. .................................................. 188/106, 92/63; 188/170
[51] Int. Cl. ..................................................... F16d 65/14
[50] Field of Search .......................................... 188/106F, 170; 92/63, 64

[56] References Cited
UNITED STATES PATENTS

| Re26,432 | 8/1968 | Cox, Jr. et al. ................ | 92/63 |
| --- | --- | --- | --- |
| 2,873,579 | 2/1959 | Safford ......................... | 92/63X |
| 3,176,467 | 4/1965 | House ........................... | 188/170X |
| 3,181,426 | 5/1965 | Ike ................................ | 92/63X |
| 3,297,115 | 1/1967 | Waloen et al. ................ | 188/170 |

FOREIGN PATENTS

| 944,223 | 12/1963 | Great Britain ................ | 92/63 |

Primary Examiner—George E. A. Halvosa
Attorney—James E. Nilles

ABSTRACT: A fluid operated combination brake having a fluid operated service brake for applying variable braking force to a moving part, and also having a locking device for the brake which has mechanical means to lock the moving part when it is to be held stationary or in the event of a power failure; the locking device is hydraulically released against the bias of the mechanical means.

INVENTOR
L.C. RUSSLER
BY James E. Nilles
ATTORNEY 3,557,913

COMBINATION SERVICE AND PARK FLUID OPERATED BRAKE

BACKGROUND OF THE INVENTION

The invention pertains to brakes of the type for applying a variable braking force to a moving part such as a brakeshoe or disc-type brake, an anvil or caliper-type brake, or the like, and also for locking the brake in holding position.

Prior art devices of this general type have been proposed, such as for example the U.S. Pat. No. 2,673,624 to Huber entitled "Locking Means" or U.S. Pat. No. 2,873,579 of Feb. 17, 1959 to Safford entitled "Dual Brake Cylinder with Lock." These devices used locking rings to lock the brake, which rings were actuated by fluid pressure, and as a result left something to be desired because they depended on pressure of the fluid to set the locking mechanism. Another type of prior art is shown in the U.S. Pat. No. 2,759,569 to Keehn entitled "Emergency and Parking Brake System Including Mechanical Locking Means in Fluid Actuated Brakes" and in that patent an air cylinder is used to actuate the locking ring which in turn holds the plunger extended in the locked position. This device, as did many other prior devices, also required separate and numerous parts of a complicated nature and were not absolutely fail proof.

SUMMARY OF THE INVENTION

The present invention provides a fluid operated, combination service and park brake which is formed as a single, compact, and efficient unit which positively locks the brake in holding position by a mechanical means, such as a spring, and is not dependent on fluid pressure or other devices, which are subject to malfunction or nonfunction, in order to engage the park brake. The invention includes a separate, hydraulically actuated piston for releasing the mechanical locking means to release the brake prior to operation of the service brake, and also includes a hydraulically actuated service brake for applying a variable force to a moving part, such as a brake disc for example.

The arrangement of the improved combination brake is such that when the moving part is to be held stationary, particularly for any length of time as when the vehicle with which it is associated is parked, or in the event of electric power failure to the brake system, the park brake will immediately and positively lock the service brake to prevent movement of the moving part.

These and other objects and advantages of the present invention will appear hereinafter as this disclosure progresses, reference being had to the accompanying drawings.

DESCRIPTION OF A PREFERRED EMBODIMENT

Figure 1:
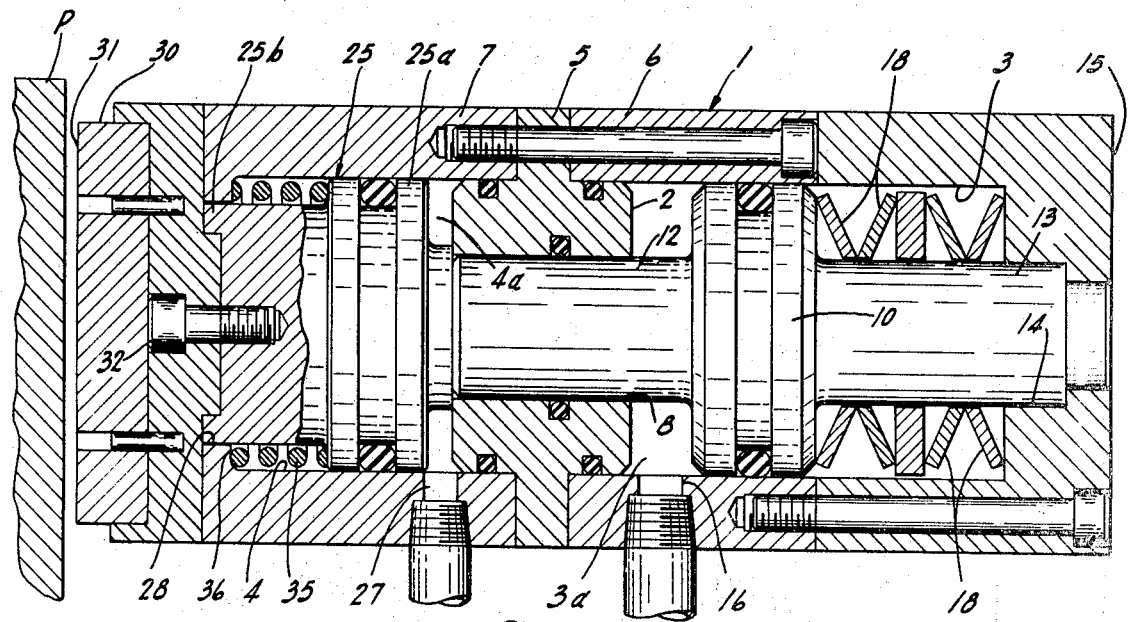
FIG. 1 is a longitudinal, cross-sectional view through a combination brake made in accordance with the present invention.
Figure 2:
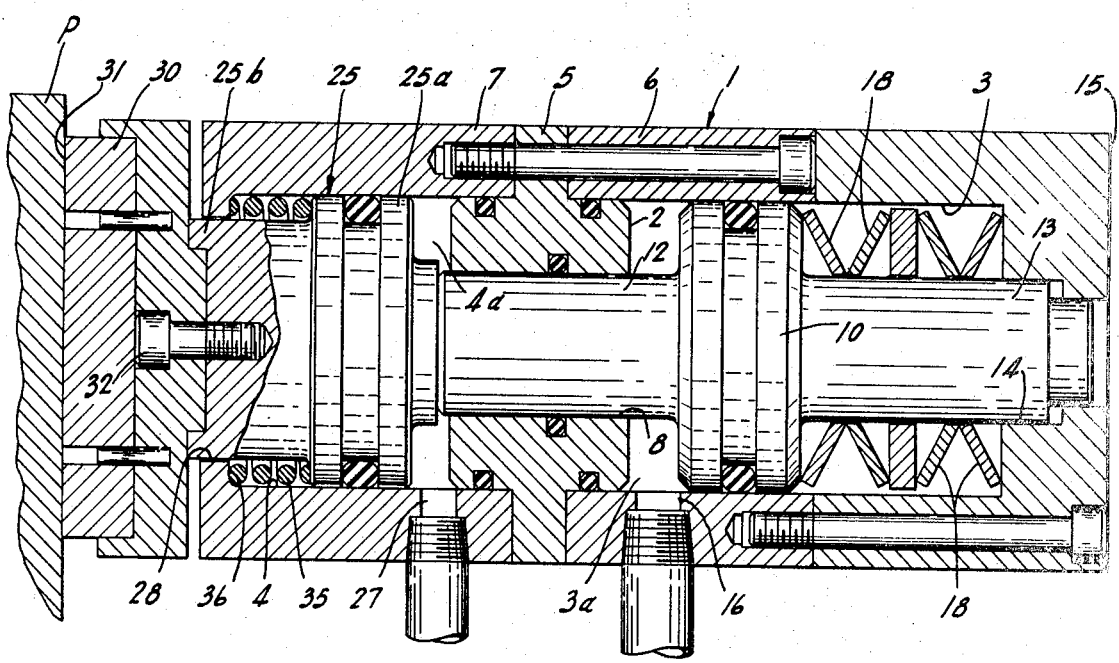
FIG. 2 is a view similar to FIG. 1, but showing the parts moved to a different position; that is when the service brake is being applied and the park brake is in the operative position.

The combination brake provided by the present invention includes an elongated cylinder 1 having an internal wall 2 which defines two separate piston chambers 3 and 4. The wall 2 is formed as a separate, ring like piece having a flange 5 which is inserted between the ends of the adjacent housing members 6 and 7. Wall member 2 is sealingly engaged with the internal surface of the cylinder. The wall has a central passage 8.

PARK BRAKE

A parking brake piston 10 is sealingly and slideably mounted in the chamber 3. The piston 10 has a rod 12 formed integrally therewith and extending through the passage 8 and through the internal wall. The piston has a second rod 13 which extends from its other side and is mounted in the counterbore 14 of the end wall 15 of the cylinder. Thus the parking brake piston is supported at each end. A passage means 16 extends through the cylinder and is located adjacent the wall 2 and this passage means serves to conduct fluid pressure into the chamber 3 and more particularly, in the expandable chamber 3a on that side of the piston 10 adjacent the wall 2. Thus, when fluid pressure is introduced via passage means 16, the piston 10 is urged to the right, (as viewed in the drawings) that is to the brake released position (FIG. 1), as will appear.

Spring means in the form of Belleville springs 18 are located around the piston rod 13 and in the chamber 3 on the opposite side of piston 10 from the internal wall 2. These Belleville springs act to urge the piston 10, and its associated rods 12 and 13 to the left (as viewed in the drawings), that is to a parking brake engaged position. The springs 18 act to apply the parking brake, as will appear, to a moving part P, when pressure fluid is not present in the chamber 3a. On the other hand, when it is desired to disengage the park brake, pressure fluid in a sufficient amount is introduced via passage 16 so as to overcome the bias of the Belleville springs.

SERVICE BRAKE

Also mounted within the cylinder, but at the other end thereof and in chamber 4, is a service brake piston means 25 including a piston 25a which is slideable in chamber 4 and is engageable on one of its sides by the piston rod 12 of the parking brake piston 10. That is to say, when the pressure is relieved from chamber 3a of chamber 3, The Belleville springs 18 urge the piston rod 12 to the left and against the service brake piston means 25.

Second fluid passage means 27 extends through the cylinder and into the other chamber 4 adjacent the internal wall 2 and serves to admit fluid pressure to the expansible chamber 4a which is located between the wall 2 and the piston 25a. The service brake piston means has a brake engaging member 30 fixed on its end. A friction surface 31 is fixed on the outer end of member 30 by any suitable means, such as a cap bolt 32. The rod portion 25b of the piston means 25 is slidingly supported in a bore 28 in the end of the cylinder.

OPERATION

The arrangement is such that when pressure fluid is admitted via passage means 27, and pressure fluid is present in chamber 3a of the parking brake piston, the service brake piston 25 can be urged to the brake engaging position with any degree of braking force desired depending on the amount of pressure fluid admitted via this second fluid passage means 27. Thus, the braking force applied by the brake surface 31 can be variably adjusted by the amount of fluid pressure admitted to chamber 4a.

The friction surface 31 is adapted to abut against a moving part P whose speed or movement is desired to be controlled. For example, brake pressure may be applied against a brakeshoe, a disc brake, an anvil or caliper brake or other moving parts.

A spring 35 is located in chamber 4 and bears against an internal shoulder 36 of the cylinder and also against the piston 25a and acts to urge the latter to a brake disengaging position when pressure fluid is not present in chamber 4a, that is to say it acts to return the piston 4 to the brake disengaged position.

RESUME

When fluid pressure is not present in chamber 3a of the parking brake chamber, the Belleville springs 18 act to automatically and positively urge the piston 10 to the left or to the brake engaging position where its piston rod 12 in turn urges the service brake piston means 25 to brake engaging position. Thus, in the event of electric power failure to the hydraulic system for any reason, the brake will be automatically set by the mechanical spring means. This locking device is hydraulically released when pressure is admitted to chamber 3a, thus urging the piston 10 in the opposite direction and against the bias of the Belleville springs. Under these circumstances, fluid pressure can be admitted to the service brake chamber 4a for urging the brake engaging member 30 against the moving part P with any degree of force desired and during this brake applying operation, the parking brake is inoperative.

The entire combination is formed as an integral unit and is compact in size and efficient in being able to apply a variable force by the service brake while at the same time insuring that the brake locks positive upon electric power failure or when pressure fluid is not present in the parking brake portion.

I claim:

1. A combination service and park brake comprising: a cylinder including two housing members and a ringlike piece located between said housing members and rigidly and detachably secured therewith to form an internal wall intermediate the length of said cylinder, said cylinder also having an end wall at the end of one of said chambers; a parking brake piston slideable in one of said chambers and a first rod extending from said brake piston and sealingly through said internal wall; said parking brake piston having a second rod extending from its side opposite said first rod; a said second rod being slideably supported in said end wall whereby said parking brake piston is supported at each end, fluid passage means extending into said one of said chambers and located adjacent said internal wall; for conducting pressure fluid to one side of said parking brake piston to urge the parking brake piston in one direction toward a brake released position; Belleville spring means in said one chamber and surrounding said second rod and located on the opposite side of said parking brake piston to urge said piston in the other direction to a brake engaged position; a service brake piston means slideable in the other chamber and engageable by said extending rod of said parking brake piston when said spring means moves said parking brake piston sufficiently towards said internal wall; a brake engaging member at the end of said cylinder and mounted on said service brake piston means; second fluid passage means extending into said other chamber and adjacent said internal wall for admitting fluid pressure into said other chamber to cause said service brake piston means and said member to move into brake engaging position.